F. Ellis,
Portable Fence,
Nº 64,509. Patented May 7, 1867.
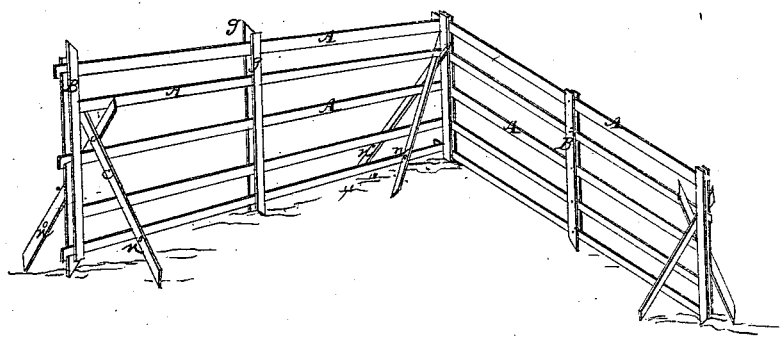
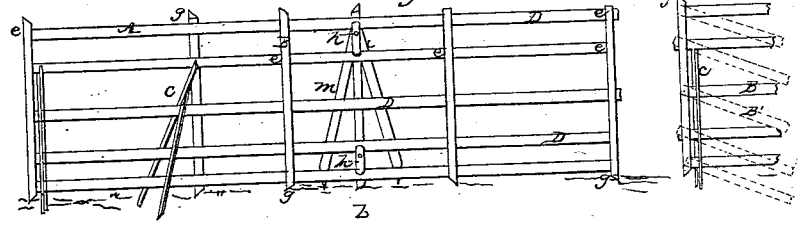
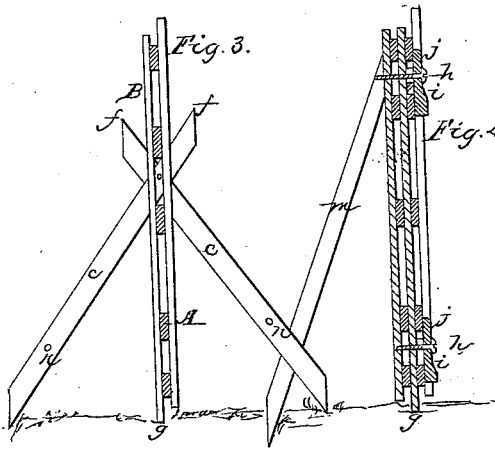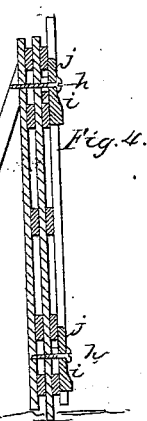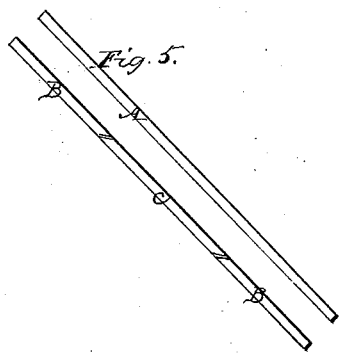
Witnesses
A. M. Bacon
Chas. H. Poole
Inventor
Freeman Ellis

United States Patent Office.

FREEMAN ELLIS, OF LAFAYETTE, OHIO.

*Letters Patent No. 64,509, dated May 7, 1867*

IMPROVEMENT IN FENCE.

*The Schedule referred to in these Letters Patent and making part of the same.*

TO ALL WHOM IT MAY CONCERN:

Be it known that I, FREEMAN ELLIS, of Lafayette, Medina county, State of Ohio, have invented new and useful improvements in Portable Fences and Gates; and I do hereby declare the following to be a full and exact description of the same, reference being had to the drawings that accompany and form a part of these specifications, in which—

Figure 1 is a view in perspective, with manner of connecting and staying the angles.

Figure 2, front elevation, showing also the gate partly open.

Figure 3, cross-section.

Figure 4, also a cross-section cut on the line $a$.

Letter A, panels of the fence; letter B, posts or standards; letter C, braces, in form as shown in fig. 3; letter D, gate-panel or gate; letters $e$ $e$, bolts or nails; letter $f$, points of the pieces forming the braces; letter $g$, pointed ends of the posts B; letter $h$, pins or bolts in the posts B, on which the gate slides; letters $i$ $i$, bands or trucks in the pins $h$ $h$, to allow the gate to be moved more easily; letters $j$ $j$, guards to keep the gate in place; letters $m$ $m$, braces placed on the opposite side of the fence to the gate for support, as the braces C could not well be used at these places.

One feature of my invention consists in having one end of each post B square, and the other pointed; while they are arranged and combined with the rails so that each pointed end shall extend a few inches beyond the square end of its collateral ones. This, as may be observed in the drawings, places some of the points and some of the square ends on each edge of the fence. With this provision, when the ends of the posts in the ground are decayed the fence may be inverted and the points $g$, before up, will be down and slightly in the ground. In this way a fence may be used a very long time before it will need to be taken apart for repairs. The square ends of the posts B are purposely left a little short of the points, so as in soft land to rest on the ground and keep the fence from settling so much as to bring the rails too near the earth.

Another feature is the structure of the braces, in having the bevel or sharpening all on one side, and arranged as shown in fig. 3, so when they settle or are forced into the ground the lower ends will not spread apart unduly, and thereby leave the close fitting to the rails at the crossing above.

Having arranged the fence and braces in position, a little driving upon the top of the posts will force the sharpened end $g$ into the ground, and at the same time the rail A, above the cross of the braces, will press the braces down, the sharpened ends entering the ground more or less. The manner of bevelling the two ends of the strips C, and providing the two holes in each, affords the opportunity to change ends of any one of them when the lower end may have decayed.

In setting these braces they may be placed anguing, as shown near the left of fig. 2. At an angle, as in fig. 1, there are notches in the rails, which hook on to each other. The angle may be greater or less, at pleasure, and a brace arranged as illustrated gives the requisite support. The red lines in fig. 2 show how the rails A, by simply turning on the rivets or bolts $e$, become adjusted to the descent or ascent of the grade of the line the fence is to run. The braces $m$ $m$ may be of one piece, as in fig. 3, or two, as in fig. 1. Each gate-panel in opening slides back one-half its length, so a gate for carriages and harnessed teams should be composed of two panels, opening the one opposite to the other.

An important consideration in the structure of my gate, and method of hanging and opening and closing it, is that it adjusts itself to the ground where it stands, being put together the same as the other parts of the fence, and can be raised in case of snow or other obstruction. In winter season, or at any other time, the gate is easily removed simply by turning the guards $j$ $j$ to a horizontal position and lifting it from its bearings Figure 5 shows the manner of cutting the small pieces from the same kind of strips that are used for the rails A, two posts B and one brace C being taken from each strip with no waste whatever.

I do not claim broadly a portable fence with sharpened posts, nor do I claim staying it by braces independent of the structure of such braces, or running the gate on rollers.

What I do claim and desire to secure by Letters Patent, is—

1. A fence provided with the posts B, arranged and constructed so as to render it adapted for being inverted, that is, used either side up, substantially as and for the purposes set forth.

2. The blocks $j$ $j$, when arranged upon and combined with the pins $h$ $h$ and pulleys $i$ $i$, as and for the purposes specified.

FREEMAN ELLIS.

Witnesses:
CHAS. H. POOLE,
CHAS. F. WILSON.